(12) United States Patent
Burout et al.

(10) Patent No.: US 7,489,508 B2
(45) Date of Patent: Feb. 10, 2009

(54) ELECTRONIC STORAGE DEVICE PLAYER HAVING A SIMULTANEOUSLY MOVING DOOR AND A DOCKING PIECE OR INTERFACE

(75) Inventors: Charles J. Burout, Bedford, NH (US); Stephen B. Mills, Atkinson, NH (US)

(73) Assignee: Brookstone Purchasing, Inc., Merrimack, NH (US)

( * ) Notice: Subject to any disclaimer, the term of this patent is extended or adjusted under 35 U.S.C. 154(b) by 249 days.

(21) Appl. No.: 11/506,248

(22) Filed: Aug. 18, 2006

(65) Prior Publication Data

US 2008/0043424 A1 Feb. 21, 2008

(51) Int. Cl.
*G06F 1/16* (2006.01)
*H05K 5/00* (2006.01)
*H05K 7/00* (2006.01)

(52) U.S. Cl. ........................ 361/686; 439/326
(58) Field of Classification Search ............... 361/686, 361/684, 737; 439/131, 139, 326; 235/441
See application file for complete search history.

(56) References Cited

U.S. PATENT DOCUMENTS

| | | | | |
|---|---|---|---|---|
| 5,933,328 A | * | 8/1999 | Wallace et al. | 361/737 |
| 5,980,294 A | * | 11/1999 | Kanda et al. | 439/326 |
| 6,646,864 B2 | * | 11/2003 | Richardson | 361/681 |
| 7,280,854 B2 | * | 10/2007 | Sugawara et al. | 455/575.1 |
| 2005/0282417 A1 | * | 12/2005 | Tsao | 439/131 |
| 2006/0205258 A1 | * | 9/2006 | Cho et al. | 439/326 |

* cited by examiner

*Primary Examiner*—Hae Moon Hyeon
(74) *Attorney, Agent, or Firm*—Grossman, Tucker, Perreault & Pfleger

(57) ABSTRACT

A substantially waterproof player presents content stored on an electronic storage device. The player has a body with a recess that houses the storage device and a closeable opening to permit access to the recess. A door is connected to the body and moves between an open position allowing access to the recess from outside the body and a closed position covering the opening. A docking piece in the recess holds the storage device, and moves between a receiving position for receiving and removing the storage device and a housed position for holding the storage device. The docking piece moves into the receiving position when the door moves into the open position. The docking piece moves into the housed position when the door is moved into the closed position. An input device in the recess receives the content from the storage device.

29 Claims, 4 Drawing Sheets

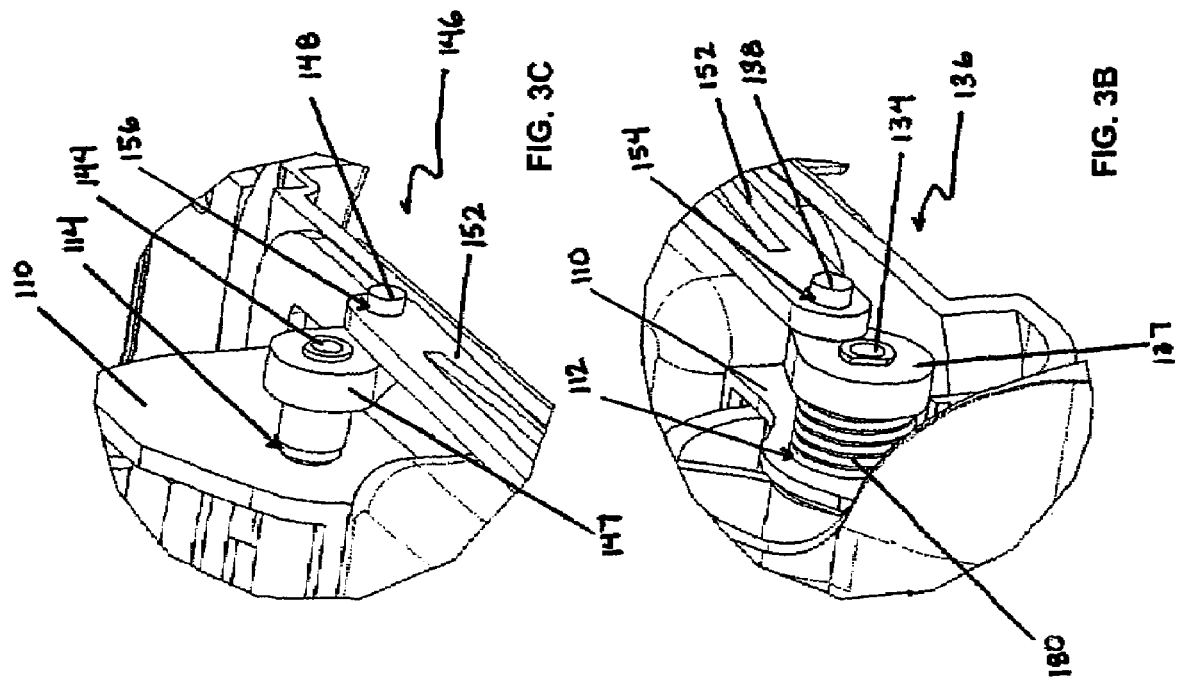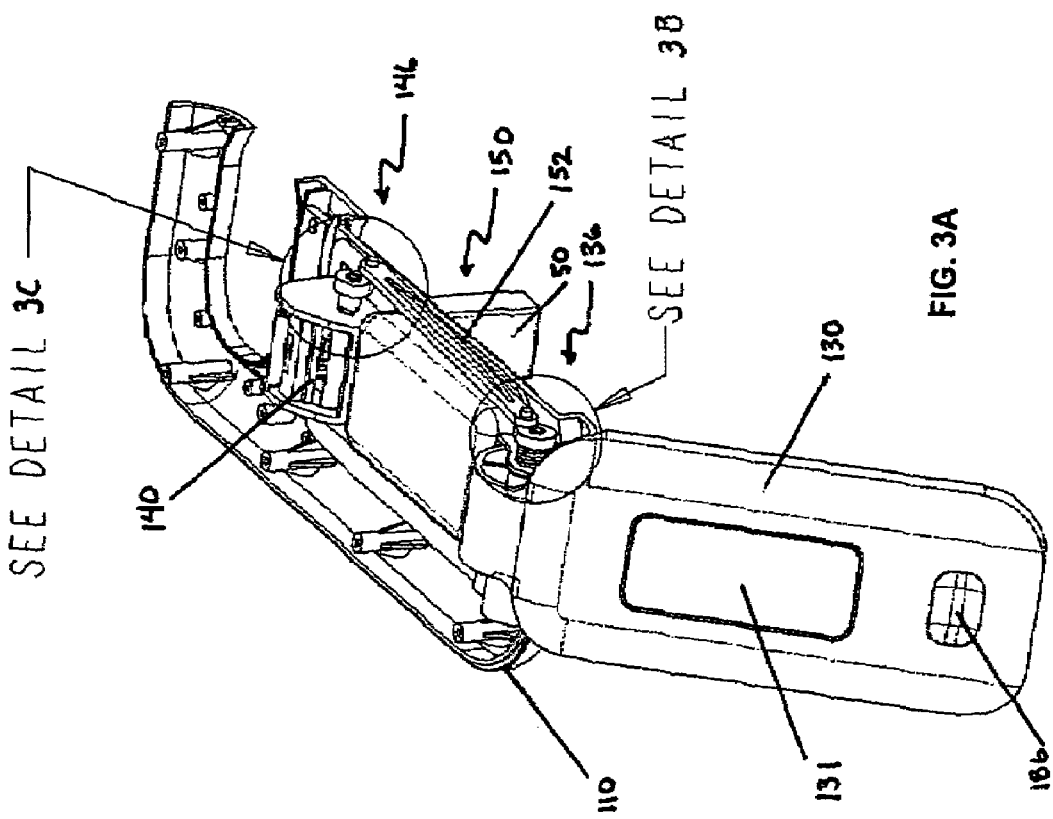

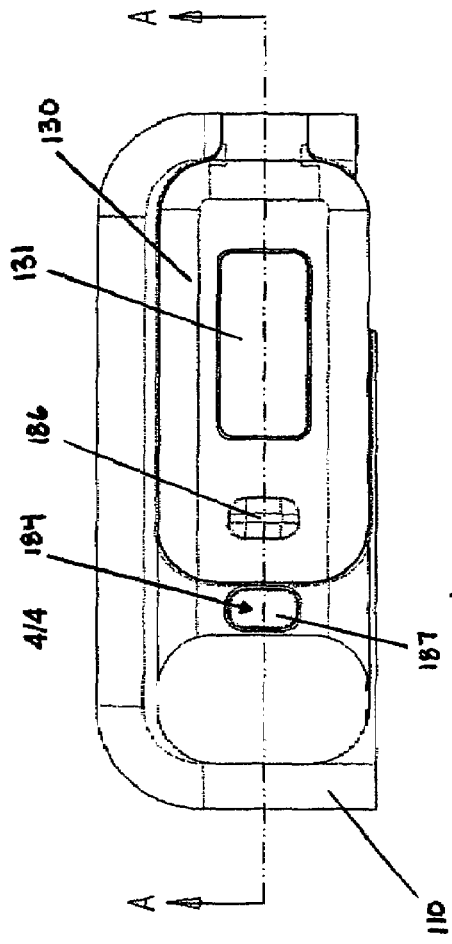
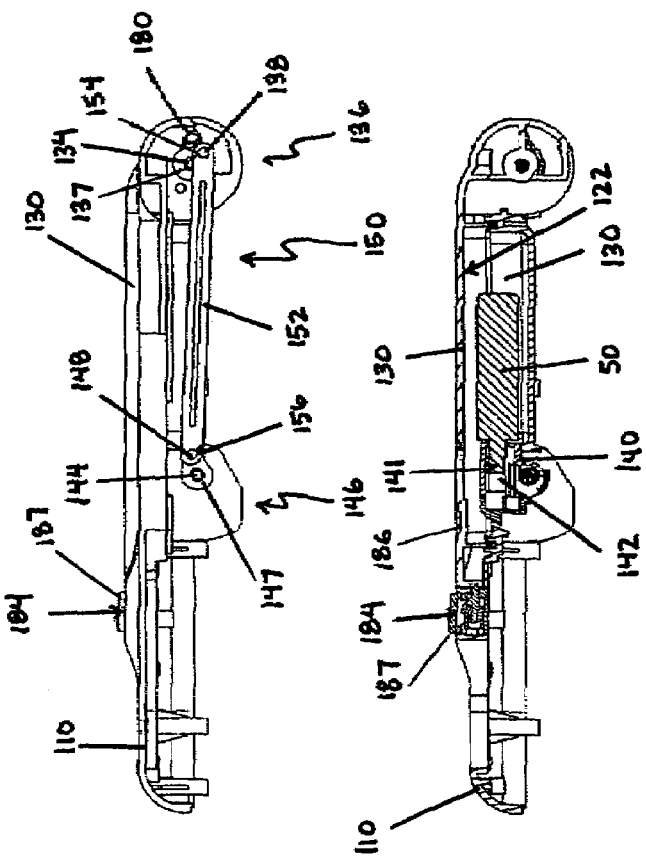
FIG. 4A
FIG. 4B
FIG. 4C

ELECTRONIC STORAGE DEVICE PLAYER HAVING A SIMULTANEOUSLY MOVING DOOR AND A DOCKING PIECE OR INTERFACE

BACKGROUND OF THE INVENTION

1. Field of the Invention

The present invention relates generally to an apparatus for presenting electronic media content, and more particularly, to an apparatus for receiving and presenting electronic media content from a portable electronic storage device that is detachably connected to the apparatus.

2. Description of the Related Art

Large digital files containing electronic media content, such as music, movies, video clips, e-books, audio books, and other audio or visual content, are readily available on the Internet. Indeed, the increasing availability of high-speed Internet access over the past decade has led to the widespread popularity of downloading electronic media content over the Internet.

Instead of purchasing such content on conventionally factory-recorded compact discs (CD's), audio tapes, digital video disks (DVD's), video tapes, and the like, individuals are able to obtain the same content immediately and conveniently wherever and whenever Internet access is available.

Downloaded content can be stored on a variety of electronic storage devices. Such storage devices include personal computer hard drives, networked storage, writable CD's or DVD's, digital audio tapes, or other devices capable of holding large amounts of digital data. Recent advances in storage technology have also resulted in increases in storage capacities as well as reductions in size and weight of storage devices. These new advances make large amounts of content readily portable. In particular, it has been especially popular to store digital music files on portable personal audio devices, such as MP3 players, made especially to play digital music. The portability of these personal audio devices permits individuals to enjoy music wherever they go.

In addition to the convenience of downloading digital content, individuals enjoy the flexibility of being able to create customizable playlists that contain only the content that the individuals prefer. Moreover, due to the high capacity of many electronic storage devices, a large amount of content and many such playlists can be saved on a single storage device. In addition, particular storage devices, such as personal audio devices, offer repeated read-write capability, and as such, permit repeated deletion of saved content and creation of new playlists with new content.

SUMMARY OF THE INVENTION

Although high-speed Internet access and high capacity storage devices provide the convenience, flexibility, and portability of customizable playlists, there is a need for an apparatus that allows downloaded digital content stored on portable, high-capacity storage devices to be easily presented in environments where there is water or other moisture, such as a shower stall or swimming pool area. In particular, many personal audio devices, though portable, are not suitable for use in wet environments. Conventional water resistant players may exist, but such players only play CD's, which do not provide as much storage capacity as digital players and are relatively cumbersome when compared to more advanced storage devices. Moreover, CD's do not permit repeated deletion of existing content and creation of new playlists.

In addition, due to the smaller size of more advanced electronic storage devices, there is a need for an apparatus that permits easy insertion and removal of such electronic storage device.

Accordingly, the present invention provides a substantially waterproof, or water resistant, player console that receives and presents electronic content from a portable electronic storage device, such as a USB memory drive or a personal audio device, while also facilitating the insertion and removal of the storage device into and out of the player.

Accordingly, in one embodiment, the present invention provides a substantially waterproof apparatus for presenting electronic content stored on an electronic storage device. The apparatus has a body with a recess adapted to house the electronic storage device and a closeable opening to permit access to the recess. A door is connected to the body and movable between an open position allowing access to the recess from outside the body and a closed position covering the opening. A docking piece in the recess is adapted to hold the electronic storage device, where the docking piece is movable between a receiving position for receiving and removing the electronic storage device and a housed position for holding the electronic storage device within the recess. In particular, the docking piece is operably connected to the door so that movement of the door into the open position causes the docking piece to move into the receiving position, and movement of the door into the closed position causes the docking piece to move into the housed position. An input device is positioned in the docking piece, or elsewhere within the recess, where the input device detachably interfaces with the electronic storage device and receives the electronic content from the electronic storage device.

In another embodiment, the present invention provides an apparatus for housing an electronic storage device. The apparatus has a body with a recess adapted to house the electronic storage device and a closeable opening to permit access to the recess. A door is connected to the body and movable between an open position allowing access to the recess from outside the body and a closed position covering the opening. A docking piece in the recess is adapted to hold the electronic storage device, where the docking piece is movable between a receiving position for receiving and removing the electronic storage device and a housed position for holding the electronic storage device within the recess. A coupling is operably connected between the docking piece and the door, where the coupling moves the docking piece into the receiving position as the door is moved into the open position, and moves the docking piece into the housed position as the door moves into the closed position. In one particular embodiment, the coupling is a linkage bar that is connected to two respective axles about which the door and the docking piece are hinged and rotate. In this embodiment, the axles rotate when the door moves between the open and closed positions or when the docking piece moves between the receiving and holding positions. Thus, the linkage bar causes rotational movement of the docking piece between the receiving and holding positions when the door rotates between the open and closed positions, respectively. In general, the present invention causes the docking piece to be oriented in such a way as to facilitate the insertion and removal of the storage device when the door is in the open position.

In yet another embodiment, the present invention provides another apparatus for housing an electronic storage device. A body has a recess to house the electronic storage device, and a closeable opening to permit access to the recess. A door is positioned at a first side of the recess and is movable in a first direction between an open position allowing access to the recess from outside the body and a closed position covering the opening. An interface for holding the electronic storage device is positioned within the recess at a second side of the recess, opposite the first side, and is movable in a second direction, opposite the first direction, between a receiving position for receiving the electronic storage device and a housed position for holding the electronic storage device within the recess. The housing may further include a biasing device operably connected to the door and the interface and adapted to cause simultaneous movement of the door and the interface into the housed position and the receiving position, respectively. Therefore, this embodiment of the present invention provides a "pop out" mechanism to facilitate insertion and removal of the storage device from the player.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE FIGURES

FIG. 3A illustrates a bottom view of the exemplary embodiment of FIG. 1, when the door is open.

FIG. 3B illustrates a view of a hinge connecting the door to the body of the exemplary embodiment of FIG. 1, when the door is open.

FIG. 3C illustrates a view of a hinge connecting the docking piece to the body of the exemplary embodiment of FIG. 1, when the door is open.

FIG. 4A illustrates a top view of the exemplary embodiment of FIG. 1, when the door is closed.

FIG. 4B illustrates a side view of the exemplary embodiment of FIG. 1, when the door is closed.

FIG. 4C illustrates a cross-sectional side view of the exemplary embodiment of FIG. 1, when the door is closed.

DETAILED DESCRIPTION

In order to overcome the shortcomings of the conventional systems described previously, the present invention provides a substantially waterproof, or water resistant, apparatus for receiving and presenting electronic content from a portable electronic storage device in an environment where there is water or other moisture. In addition, the present invention facilitates the insertion and removal of the electronic storage device from the substantially waterproof device.

Figure 1:
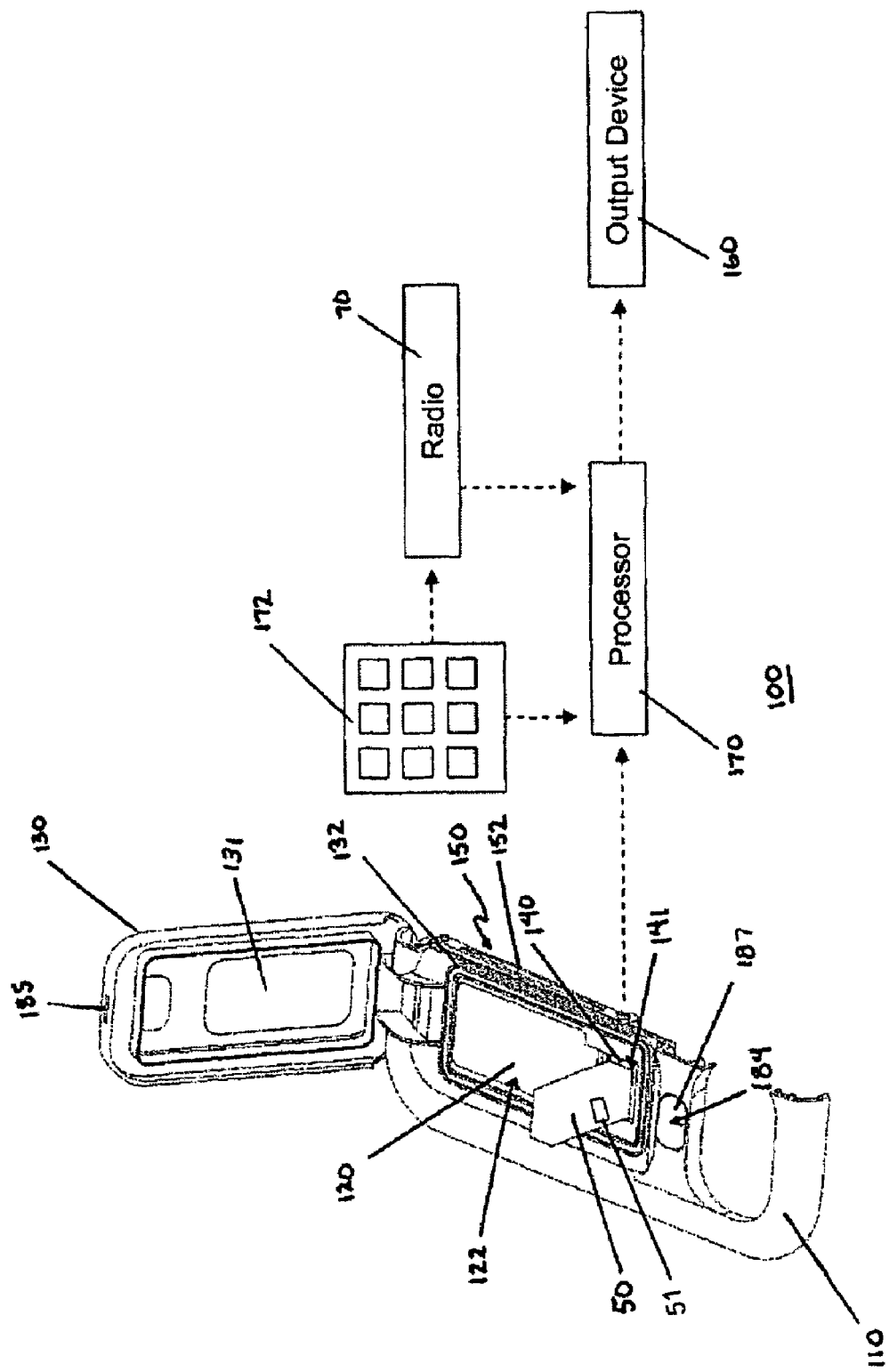
FIG. 1 illustrates a top view of an exemplary embodiment of the present invention, when the door is open.

An exemplary embodiment of the present invention is illustrated in FIG. 1. In particular, FIG. 1 shows a portion of the substantially waterproof electronic storage device player, or console, 100 that presents electronic media content stored as data on an electronic storage device 50. The electronic media content stored on the storage device 50 may include music, movies, video clips, e-books, audio books, or any other audio or visual content. Moreover, the electronic media content may employ any type of digital format or encoding, including, but not limited to, an MP3 or MP3-like codec.

The electronic storage device 50 may be a universal serial bus (USB) memory drive, also known as a flash drive or jump drive. As is known, a USB memory drive is a portable storage device that uses flash memory, a type of constantly-powered nonvolatile memory. It is typically small, lightweight, removable and rewritable, and has capacities in the range of 256 megabytes to 2 gigabytes. Moreover, the USB memory drive benefits from a plug-and-play interface (standard type-A USB connection) to readily exchange data with a computer or a device such as the electronic storage device player 100. Although the exemplary embodiment shown in FIG. 1 may employ a USB memory drive, it is understood that other storage technologies are compatible with the present invention. The present invention may be compatible with personal audio devices, such as MP3 players. In addition, other compatible storage technologies may include memory cards, external drives, ZIP disks, JAZ disks, other types of disk storage, tape storage, magnetic storage, optical storage, or other flash memory. In general, the electronic storage device 50 is capable of portably storing large amounts of data, in the form of audio or visual content. Furthermore, the electronic storage device 50 permits another device, such as the electronic storage device player 100, to readily access the data through some type of an interface.

Advantageously, portable storage devices, such as USB memory drives or personal audio devices, enable a user to create customized playlists. For instance, a user may download selected music files from the Internet and store them onto the electronic storage device 50 in a customized order. In addition, the erasable and reprogrammable nature of devices such as USB memory drives or personal audio devices permits the user to manage, organize, or change the playlists. Thus, with the portability of the memory drive, the user can conveniently transport electronic content for use in the substantially waterproof electronic storage device player 100 in an environment where water or moisture is present, without concern for damage to the electronic storage device 50.

As shown in FIG. 1, the player 100 has a substantially waterproof body 110, which may be a part of a greater housing which protects interior electronic components from water or moisture. The player 100 is constructed of a water impermeable material, such as a plastic. In general, the player 100 may be used where it is likely to be exposed to exposure to significant moisture, such as a shower stall or swimming pool area. As such, preferably, the material is also shatterproof as the present invention may be used areas where persons in the area may be barefoot.

The body 110 has a recess, or chamber, 120 in which the electronic storage device 50 can be positioned. The recess 120 has a closeable opening 122 which readily permits the storage device 50 to be positioned in, or removed from, the recess 120. The recess 120 is sized and shaped according to the size and shape of the electronic storage device 120 intended for use with the device 100, whether, for instance, the storage device 50 is a USB memory drive, a personal audio device, or a device of other size and shape. In general, the recess 120 is sized to permit the positioning of the entire electronic storage device 50 within the recess 120.

A door 130 is connected to the body 110 and is movable between an open position allowing access to the recess 120 from outside the body 110 and a closed position covering the recess 120. The open position is shown in FIGS. 1, 2, and 3A-3C, and the closed position is shown in FIGS. 4A-4C. When the door 130 is in the open position, the door extends outwardly away from the opening 122. On the other hand, when the door 130 is in the closed position, the door 130 is aligned over the opening 122 to cover the recess 120. The door 130 may have a window 131, having a watertight seal with the door, to allow a user to view the contents of the recess 120 when the door 130 is in the closed position. The door 130 may be made from a material similar to the body 110, but is in general made of an impermeable material.

In the exemplary embodiment, one or more rubber or plastic seals 132 is placed around the recess 120 where the door contacts the body 110 in the closed position. As a result, the door 130 creates a watertight closure with the body 110, preventing water or moisture in the surrounding environment from entering the recess 120 when the door 130 is in the closed position. It is understood, however, that other mechanisms for creating the watertight closure can be employed in place of the rubber or plastic seal 132. For instance, a very tight tolerance can be created by the contact between the door 130 and the body 110 through which water cannot pass.

A docking piece 140 is positioned in the recess 120 and is adapted to hold the storage device 50. The docking piece 140 is movable between a receiving position, as shown in FIG. 1, for readily receiving the storage device 50 and a housed position, as shown in FIG. 4C, for holding the storage device 50 within the recess 120. The storage device 50 is also readily removable from the docking piece 140 when the docking piece 140 is in the receiving position. As also illustrated in FIGS. 1 and 4C, the docking piece 140 has a receiving cavity 141 into which a portion of the storage device 50 is stably positioned. When the docking piece 140 is in the receiving position, the receiving cavity 141 faces outwardly through the opening 122, as shown in FIG. 1. Meanwhile, when the docking piece 140 is in the holding position, the docking piece 140 is aligned with the opening 122 and positioned completely within the recess 120, as illustrated in FIG. 4C.

In a particular embodiment of the present invention, the player 100 interfaces with a USB memory drive and is designed to hang on a wall so that the USB memory drive is oriented with its standard type-A USB connection pointing downward. In other words, the player 100 is oriented so that the door 130 and the opening 122 are vertical. The door 130 rotates, or pivots, upward into an open position preferably forming at least a 90-degree angle with the opening 122. Meanwhile, the docking piece 140 rotates, or pivots, downward into the receiving position preferably forming approximately a 90-degree angle with the vertical. In general, the angle of the door 130 in the open position and the angle of the docking piece 140 in the receiving position facilitate insertion and removal of the storage device and are not limited to the specific angles described herein. Advantageously, the orientation of this particular embodiment permits the player 100 to hang relatively flat against a wall, while making insertion and removal of the storage device 50 simple.

Referring now more generally to FIG. 4C, an input device, or interface, 142, such as a USB port or connector for a personal audio device, is positioned in the docking piece 140. The input device 142 may also be referred to as a receptical socket or jack. Thus, as shown in FIG. 4C, when a portion of the storage device 50 is positioned in the docking device 140, the storage device 50 detachably interfaces with the input device 142. The engagement between the storage device 50 and the input device 142 provides the interface for the transfer of electronic content from the storage device 50 via a processor 170 to an output device 160 which presents the electronic content in an appropriate format to the user.

While FIG. 4C illustrates the input device 142 preferably positioned within the docking device 140, other embodiments of the present invention may have an input device 142 that is positioned outside the docking device 140, but within the recess. For instance, an embodiment may receive digital content from a personal audio device through a headphone jack of the personal audio device which is not accessible from the area of the docking device 140. As such, the input device 142 may be a headphone plug positioned in a part of the recess 120 that is outside the docking device 140. Regardless of where the input device 142 is positioned in the recess 120, however, the docking device 140 facilitates the positioning of the personal audio device within the recess 120.

The processor 170 is adapted to receive the electronic content from the input device 142 and to send the electronic content to the output device 160 in the form of a signal compatible with the output device 160. If the electronic content includes music files, the output device 160 may be acoustic speakers for transmitting the music to the surrounding environment, and the processor 170 may convert the data from the storage device 50 into electrical signals to drive the acoustic speakers. However, the output device 160 may be any suitable device for presenting the content, such as a video screen in combination with speakers. Of course, the player 100 has a power source (not shown), such as battery power, which provides power to operate the electronics in the device.

Figure 2:
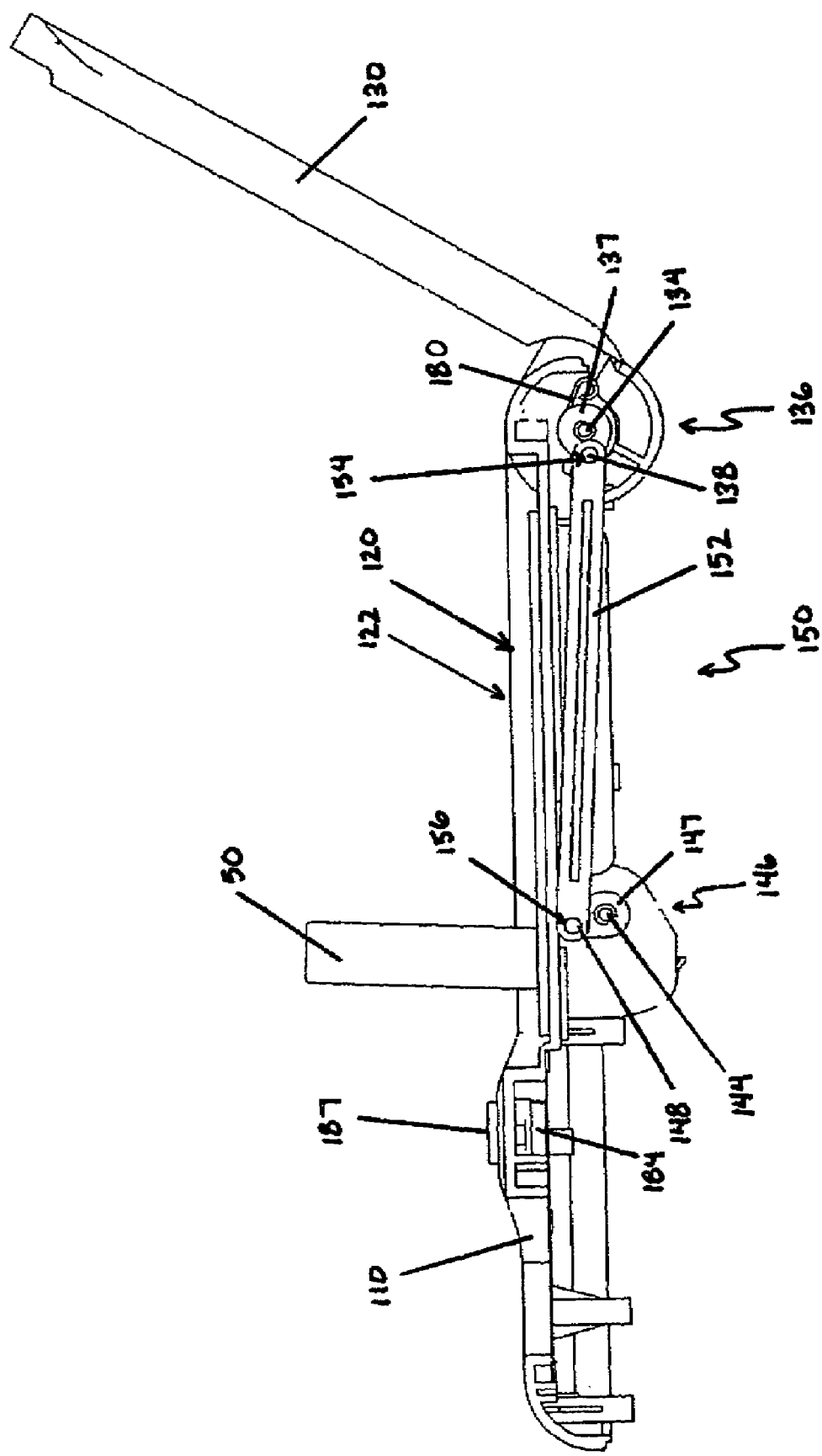
FIG. 2 illustrates a side view of the exemplary embodiment of FIG. 1, when the door is open.

As generally shown in FIG. 2, a coupling 150 is operably connected between the docking piece 140 and the door 130. The coupling 150 employs a linkage bar 152, but it may be any connection, such as a gear, belt, or other type of link, that causes the docking piece 140 to be oriented to permit convenient insertion and removal of the storage device 50 when the door 130 is in the open position. The particular structural features of the coupling 150 described with respect to the exemplary embodiment are provided to facilitate understanding of how motion of the door 130 can cause corresponding motion of the docking piece 140. More generally, the present invention may use any device which coordinates the positioning of the docking device 140 with the door 130.

When the door 130 moves into the open position, the coupling 150 moves the docking piece 140 into the receiving position. On the other hand, when the door 130 moves into the closed position, the coupling moves the docking piece 140 into the housed position. Thus, operation of the player 100 to insert or remove the storage device 50 from the player 100 is reduced to simple operation of the door 130.

As is apparent from FIGS. 2 and 3A, the docking piece 140 and the door 130 rotate in opposite directions. A first axle 134 extends through the door 130 and through a first body hole 112 in the body 110, creating a first hinge 136. Thus, the first hinge 136 joins the door 130 with the body 110. The door 130 rotates, or moves, about the first hinge 136 and the first axle 134 when moving between the open position and the closed position.

Meanwhile, a second axle 144 extends through the docking piece 140 and through a second body hole 114 in the body 110, creating a second hinge 146. Thus, the second hinge 146 joins the docking piece 140 and the body 110. The docking piece 140 rotates, or moves, about the second hinge 146 when moving between the receiving position and the housed position.

In particular, referring to FIG. 3B, a first connecting piece 137 is attached to the first axle 134 and has a first pin 138 which extends substantially parallel to the first axle 134. The first pin 138 is offset from the first axle 134 to cause the first pin 138 to revolve as the first axle 134 rotates. Similarly, as illustrated in FIG. 3C, a second connecting piece 147 is attached to the second axle 144 and has a second pin 148 which extends substantially parallel to the second axle 144. The second pin 148 is offset from the second axle 144 to cause the second pin 148 to revolve as the second axle 144 rotates. The linkage bar 152 has a first bar hole 154 and a second bar hole 156. The first pin 138 is rotatably connected to the linkage bar 152 through the first bar hole 154. On the other hand, the second pin 148 is rotatably connected to the linkage bar 152 through the second bar hole 156.

Accordingly, when the door 130 rotates, the first axle 134 correspondingly rotates in the first body hole 112 in the body 110. When the first axle 134 rotates, the first connecting piece 137 rotates and the first pin 138 revolves, causing the linkage bar 152 to move. The motion of the linkage bar 152 causes the second pin 148 to correspondingly revolve and the second connecting piece 147 and the second axle 144 to rotate. When the second axle 144 rotates in the second body hole 114, the docking piece 140 rotates. Thus, in general, the linkage bar 152 between the door axle 130 and the docking piece 140 causes the second axle 144 and thus the docking piece 140 to rotate when the door 130 and first axle 134 rotate.

Although movement of the docking piece 140 between the receiving position and the housed position may initiate and cause corresponding movement of the door 130 between the open position and the closed position, it may be preferable to prevent the door 130 from moving hen a user directly moves the docking piece 140, in order to minimize the stresses arising from the coupling between the docking piece 140 and the door 130. In this case, movement of the door 130 causes movement of the docking piece 140, but not vice versa.

As shown in FIGS. 1, 3A, and 4B-4C, a biasing device 180 creates a force to keep the door 130 in the open position. The biasing device 180 in the illustrated exemplary embodiment employs a spring positioned proximate to the first hinge 136 of the door 130, though the present invention is not limited to the use of a spring. The biasing device 180 connects the door 130 to the body 110. When the door 130 rotates from the open position, the spring of biasing device 180 stretches from a relaxed state to create a force that resists movement of the door 130. Thus, as illustrated in FIG. 4C, in order to keep the door 130 in the closed position, a releasable locking device 184 positioned on the body 110 engages the door 130 at a cavity 185 and blocks movement of the door 130. The pushbutton 187, shown clearly in FIG. 1, is pressed to move the locking device 184 from engagement with the cavity 185 in the door 130, allowing the biasing device 180 to move the door 130 into the open position. Of course, as explained previously, this movement of the door 130 into the open position also causes the docking piece 140 to move into the receiving position. The general effect of the biasing device 180 is to create a "pop out" mechanism to facilitate insertion and removal of the storage device 50 from the player 100. The door 130 may have a depression 186 which accommodates the user's fingers to move the door 130 into the closed position. Meanwhile, simple operation of the pushbutton 187 releases the door 130 from the closed position, and the biasing device 180 exerts a force to automatically move the door 130 into the open position and the docking piece 140 into the receiving position. Although the biasing device 180 in this exemplary embodiment connects the door 130 to the body 110, it is understood that a biasing device 180 could be applied to the docking piece 140 to bias the docking piece 140 into the receiving position, and because the door 130 is operably coupled to the docking piece 140, the biasing device 180 would also be operably connected to the door 130, and thus bias the door 130 into the open position.

In order to allow the user of the player 100 to control how the content is presented, the processor 170 may be connected to controllers 172. The controllers 172 may include a keypad, pushbuttons, switches, or the like, which give a user the ability to control the playback of the content. For example, the controllers 172 allow the user to start playing the content, stop playing the content, or to move forward or backward through the saved content. Additionally, the controllers 172 may provide control over the volume as well as the quality and characteristics of the playback, e.g. controlling the bass or treble characteristics of the audio or the contrast in the video. In response to the actions of a user through the controllers 172, the processor 170 may control how and what content on the storage device 50 is accessed through the input device 142, or how that content is presented to the user through output device 160. Furthermore, the controllers 172 can also control a secondary source of content, such as a radio 70, which can be combined with the playback features described herein.

In some cases, the storage device 50, such as a personal audio device, may have its own playback controls 51. The controllers 172 in some embodiments of the present invention may override the playback controls 51 on the storage device 50 through the interface of input device 142. Alternatively, the player 100 may allow a user to access the playback controls 51 on the storage device 50 while the storage device 50 remains sealed in the recess 120 with the door 130 in the closed position. For instance, as described above, the door 130 may have a window 131 through which the storage device 50 may be seen while sealed in the recess 120. The window 131 may be a flexible transparent material or membrane, such as a flexible transparent plastic, that allows a user to operate playback controls 51 on the storage device 50 which are located on the other side of the window 131. If the storage device 50 provides pushbuttons for playback control, a user operates these pushbuttons by pressing against an area of the flexible window, which moves or stretches to contact the desired pushbutton. Meanwhile, the flexible window continues to prevent any water or moisture from entering the recess 120.

While the present invention has been described in connection with a number of exemplary embodiments, and implementations, the present inventions are not so limited, but rather cover various modifications, and equivalent arrangements, which fall within the purview of prospective claims.

What is claimed is:

1. A presentation apparatus for presenting electronic content stored on an electronic storage device, the apparatus comprising:
    a body with a recess adapted to house the electronic storage device, and a closeable opening to permit access to the recess;
    a door connected to the body and movable between an open position allowing access to the recess from outside the body and a closed position covering the opening;
    a docking piece positioned in the recess to hold the electronic storage device, the docking piece being operably connected to the door so that movement of the door into the open position causes movement of the docking piece into a receiving position for receiving and removing the electronic storage device, and movement of the door into the closed position causes the docking piece to move to a housed position for holding the electronic storage device within the recess;
    an input device positioned in the recess, the input device adapted to detachably interface with the electronic storage device and to receive the electronic content from the electronic storage device;
    a processor adapted to receive the electronic content from the input device and to generate an output signal representing the electronic content; and
    an output device adapted to receive the output signal from the processor and adapted to present the electronic content responsive to the output signal.

2. The apparatus according to claim 1, wherein the door prevents water from entering the recess when the door is in a closed position.

3. The apparatus according to claim 2, further comprising a seal placed around the opening to the recess to engage the door and prevent water from entering the recess when the opening is covered.

4. The apparatus according to claim 1, wherein the input device is positioned in the docking piece.

5. The apparatus according to claim 1, wherein the electronic storage device is a portable universal serial bus (USB) memory drive and the input device is a USB port.

6. The apparatus according to claim 1, wherein the electronic storage device is a personal audio device.

7. The apparatus according to claim 1, wherein the output device comprises acoustic speakers.

8. The apparatus according to claim 1, further comprising controllers for the processor.

9. The apparatus according to claim 8, wherein the controllers comprise a keypad.

10. The apparatus according to claim 1, wherein the door further comprises a window having a watertight seal with the door.

11. The apparatus according to claim 10, wherein the electronic storage device has playback controls, and wherein the window on the door comprises a flexible transparent material and is adapted to permit operation of the playback controls through the flexible transparent material.

12. The apparatus according to claim 1, wherein the body forms a substantially waterproof housing holding the recess, the input device, and the output device, wherein water is prevented from entering an interior of the housing.

13. The apparatus according to claim 1, further comprising a radio integrated in the body.

14. A housing apparatus for housing an electronic storage device, the apparatus comprising:
- a body with a recess adapted to house the electronic storage device, and a closeable opening to permit access to the recess;
- a door connected to the body and movable between an open position allowing access to the recess from outside the body and a closed position covering the opening;
- a docking piece in the recess adapted to hold the electronic storage device, the docking piece movable between a receiving position for receiving and removing the electronic storage device and a housed position for holding the electronic storage device within the recess; and
- a coupling operably connected between the docking piece and the door, and adapted to move the docking piece into the receiving position as the door is moved into the open position, and to move the docking piece into the housed position as the door moves into the closed position, wherein the door rotates about a first axis between the open position and the closed position, and the docking piece rotates about a second axis between the receiving position and the housed position.

15. The apparatus according to claim 14, wherein the docking piece and the door rotate in opposite directions.

16. The apparatus according to claim 14, wherein the docking piece has a receiving cavity for receiving the electronic storage device, and
wherein when the docking piece is in the receiving position, the cavity of the docking piece faces outwardly through the opening, and wherein, when the docking piece is in the housed position, the docking piece is aligned with the opening and positioned completely within the recess.

17. The apparatus according to claim 14, wherein, when the door is in the open position, the door extends outwardly away from the opening, and
wherein, when the door is in the closed position, the door is aligned over the opening and covers the recess.

18. The apparatus according to claim 14, wherein the door approximately forms at least a 90-degree angle with the opening when the door is in the open position, and the docking piece approximately forms a 90-degree angle with the opening when the docking device is in the receiving position.

19. The apparatus according to claim 14, further comprising:
- a first hinge joining the door and the body, the door moving between the open position and the closed position by rotating about the first hinge, and
- a second hinge joining the docking piece and the body, the docking piece moving between the receiving position and the housed position by rotating about the second hinge.

20. The apparatus according to claim 19, wherein the first hinge comprises a first axle extending through the door and through a first body hole in the body, and
wherein the second hinge comprises a second axle extending through the docking piece and through a second body hole in the body.

21. The apparatus according to claim 20, wherein, when the door rotates, the first axle correspondingly rotates in the first body hole in the body,
wherein, when the docking piece rotates, the second axle correspondingly rotates in the second body hole in the body, and
wherein the coupling comprises a linkage between the first axle and the second axle, the linkage causing the second axle and the docking piece to rotate when the door and first axle rotate.

22. The apparatus according to claim 21, wherein the linkage comprises:
- a first pin attached to, and extending substantially parallel from, the first axle, the first pin being offset from the first axle to cause the first pin to revolve as the first axle rotates;
- a second pin attached to, and extending substantially parallel from, the second axle, the second pin being offset from the second axle to cause the second pin to revolve as the second axle rotates; and
- a bar having a the first bar hole and a second bar hole, the first pin being rotatably connected through the first bar hole, and the second pin being rotatably connected through the second bar hole,
wherein, when the first axle rotates, the bar moves as the first pin revolves and causes the second pin to revolve and the second axle to rotate.

23. The apparatus according to claim 14, further comprising:
- a biasing device adapted to bias the door to remain in the open position, and
- a releasable locking device to hold the door in the closed position.

24. The apparatus according to claim 23, further comprising a pushbutton adapted to release the locking device to allow the biasing device to move the door to the open position.

25. The apparatus according to claim 14, wherein an input device is positioned in the docking piece, the input device being connectable to the electronic storage device to receive electronic content from the electronic storage device.

26. A housing apparatus for housing an electronic storage device, the apparatus comprising:

a body with a recess adapted to house the electronic storage device, and a closeable opening to permit access to the recess;

a door positioned at a first side of the recess, the door being movable in a first direction between an open position allowing access to the recess from outside the body and a closed position covering the opening; and an interface for holding the electronic storage device positioned within the recess at a second side of the recess, opposite the first side, the interface being movable in a second direction, opposite the first direction, between a receiving position for receiving the electronic storage device and a housed position for holding the electronic storage device within the recess, wherein the door rotates about a first axis between the open position and the closed position, and the interface rotates about a second axis between the receiving position and the housed position.

27. The apparatus according to claim 26, further comprising a biasing device operably connected to the door and the interface and adapted to cause simultaneous movement of the door and the interface into the housed position and the receiving position, respectively.

28. The apparatus according to claim 27, further comprising a releasable locking device to hold the door in the closed position.

29. The apparatus according to claim 28, further comprising a pushbutton adapted to release the locking device to allow the biasing device to move the door to the open position.

* * * * *